United States Patent
Malpezzi

(10) Patent No.: US 7,333,506 B2
(45) Date of Patent: Feb. 19, 2008

(54) METHOD AND APPARATUS FOR OBTAINING A SCALABLE AND MANAGED BANDWIDTH FOR CONNECTIONS BETWEEN ASYNCHRONOUS LEVEL AND SYNCHRONOUS HIERARCHY LEVEL IN A TELECOMMUNICATION NETWORK

(75) Inventor: Ettore Malpezzi, Vimercate (IT)

(73) Assignee: Alcatel, Paris (FR)

( * ) Notice: Subject to any disclaimer, the term of this patent is extended or adjusted under 35 U.S.C. 154(b) by 904 days.

(21) Appl. No.: 10/179,215

(22) Filed: Jun. 26, 2002

(65) Prior Publication Data

US 2003/0002530 A1   Jan. 2, 2003

(30) Foreign Application Priority Data

Jul. 2, 2001   (EP)   ................... 01401754

(51) Int. Cl.
  *H04J 3/16*   (2006.01)
  *H04J 3/22*   (2006.01)
(52) U.S. Cl. .......................... 370/466; 370/469
(58) Field of Classification Search ................ 370/468, 370/469, 907
  See application file for complete search history.

(56) References Cited

U.S. PATENT DOCUMENTS

| 5,956,341 | A  * | 9/1999 | Galand et al. ............... 370/412 |
| 6,205,121 | B1 | 3/2001 | Heuer |
| 6,236,660 | B1 | 5/2001 | Heuer |
| 6,594,279 | B1 * | 7/2003 | Nguyen et al. ............. 370/468 |
| 6,876,671 | B1 * | 4/2005 | Rambaud et al. ........... 370/474 |
| 6,898,213 | B1 * | 5/2005 | Shimelmitz et al. ........ 370/537 |
| 6,917,630 | B1 * | 7/2005 | Russell et al. .............. 370/532 |

FOREIGN PATENT DOCUMENTS

EP   0982969 A2   3/2000

OTHER PUBLICATIONS

Chao et al, "Transport of gigabit/sec data packets over SONET/ATM netowrks", Countdown to the New Milennium, Phoenix Dec. 2-5, 1991, Proceedings of the Global Telecommunications Conference—NY, IEEE, US, vol. 3, 2 , pp. 968-975 XP010042553.
J. Manchester et al, 'IP Over Sonet, IEEE Communications Magazine, IEEE Service Center, Piscataway, NJ, US, vol. 36, No. 5, May 1, 1998, pp. 136-142 XP000752858.

* cited by examiner

*Primary Examiner*—Chau Nguyen
*Assistant Examiner*—Hicham B Foud
(74) *Attorney, Agent, or Firm*—Sughrue Mion, PLLC

(57) ABSTRACT

The present invention provides for a method and apparatus for obtaining a scalable and managed bandwidth for connections between asynchronous and synchronous hierarchy level in a telecommunication network, in which the bandwidth of the synchronous hierarchy level is rendered scalable by a variable number of connections in a link between two nodes, each of the connections being made by a synchronous frame of lower-order virtual containers only (e.g. VC12 at 2 Mb/s in SDH). The incoming data packets are singularly and independently arranged in the VCs of the various connections, ensuring their integrity. The number of connections to be used is variable and scalable, and controlled depending on the total incoming packet data rate, so as also to ensure the minimum of necessary granularity.

11 Claims, 2 Drawing Sheets

METHOD AND APPARATUS FOR OBTAINING A SCALABLE AND MANAGED BANDWIDTH FOR CONNECTIONS BETWEEN ASYNCHRONOUS LEVEL AND SYNCHRONOUS HIERARCHY LEVEL IN A TELECOMMUNICATION NETWORK

INCORPORATION BY REFERENCE OF PRIORITY DOCUMENT

This application is based on, and claims the benefit of, European Patent Application No. 01401754.5 filed on Jul. 02, 2001, which is incorporated by reference herein.

BACKGROUND OF THE INVENTION

1. Field of the Invention

The present invention relates to a method and apparatus for obtaining a scalable and managed bandwidth for connections between asynchronous level and synchronous hierarchical level in a telecommunication network.

2. Description of the Prior Art

As it is known to those working in the telecommunications field, there is a more and more emerging need for best interconnection among the nodes of a telecommunication network.

More particularly, two alternative approaches are known: in a first known type, the nodes of a packet data network, e.g. IP (Internet Protocol), can be directly interconnected by using communication procedures involving the packet data level only; in a second known type, the network nodes can be interconnected by using the transport capacity of a synchronous digital hierarchy network, e.g. SDH or SONET.

Within the framework of the second type of approach, the major technical problem to be solved is that of ensuring the best flexibility in the use of the available transport bandwidth of the synchronous digital network, as far as the badwidth demand increases with the traffic volume of packet data to be transported.

A known technique for solving this problem is to use the so-called concatenation of virtual containers, namely to arrange the packet flow in a number of concatenated lower-order virtual containers in the frame of the synchronous hierarchy network, so as to get a more complex frame structure carrying all the packets.

A drawback of this technique is that the concatenation functionality is not available at all the network nodes.

Another known technique is to use an higher-order virtual container, e.g. VC3 or VC4, according to the standard synchronous hierarchy.

However this second technique has the drawback that a too high bandwidth is requested to fully comply with the synchronous hierarchical structure, with a considerable waste of bandwith due to the fact that generally a part of the higher-order virtual containers is not used.

SUMMARY OF THE INVENTION

Therefore, in view of the known solutions, that are not quite efficient, it is the main object of the present invention to provide a method and apparatus for obtaining a scalable and managed bandwidth for connections between asynchronous and synchronous hierarchy level in a telecommunication network, which solves in an efficient way the above problems, avoiding the occupancy of unnecessary bandwidth in the synchronous hierarchy level.

The basic idea of the present invention is to render the bandwidth of the synchronous hierarchy level scalable by a variable number of connections in a node, each of the connections being made by a synchronous frame of lower-order virtual containers only (e.g. VC12 at 2 Mb/s in SDH): the incoming data packets are singularly and independently arranged in the VCs of the various connections, ensuring their integrity.

The number of connections to be used is variable and scalable, and controlled depending on the total incoming packet data rate, so as also ensuring the minimum of necessary granularity.

Connection in the following has to be interpreted as either unidirectional or bidirectional connection over a link between two network nodes.

These and further objects are achieved by means of an apparatus and method as described in the attached claims, which are considered an integral part of the present description.

The invention will become fully clear from the following detailed description, given by way of a mere exemplifying and non limiting example, to be read with reference to the attached drawing figures.

BEST MODE FOR CARRYING OUT THE INVENTION

In the following, for the sake of brevity, the packet data network will be indicated with IP, and the synchronous digital network with SDH, without limiting sense.

Figure 1:
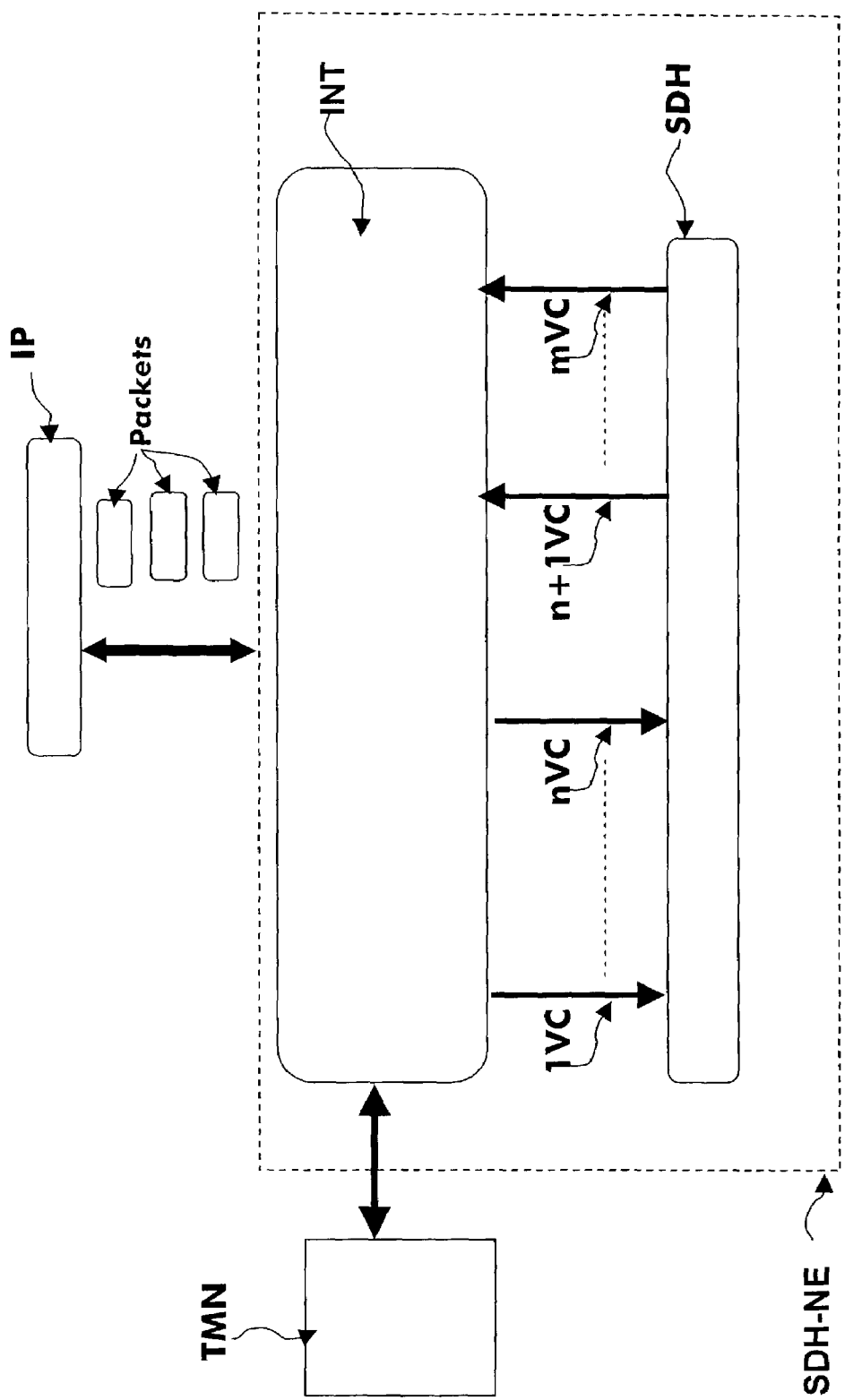
FIG. 1 shows a block diagram of the system in accordance with the invention.

As shown in FIG. 1, at the input/output of a node SDH-NE of a synchronous digital hierarchy network, e.g. SDH or SONET, an interface INT is present, for the connection with a packet data network node, e.g. IP at the level of point-to-point PPP, LAN or Ethernet interface. The connection per se is handled in a well known way.

Generally two interfaces INT with specular characteristics are necessary at the two ends of a link between two nodes: each of them handles the input/output of the data packets from/to the packet network IP. The packets are state-of-the-art IP data packets having either fixed or variable length, normally constituted by a header part, carrying addresses and other control data, and a payload part carrying the data.

In the direction from IP to SDH-NE the interface INT detects the data packets coming from IP, and arranges the packets over a number n of parallel available SDH connections made of lower-order virtual containers 1VC, 2VC, ... nVC, e.g. in SDH VC12 at 2 Mb/s.

The input packets are handled independently of each other, and inserted in a VC of a given connection n, depending on the evaluation of the instantaneous filling level of the various VCs, so as consecutive input packets may be assigned to different VCs, depending on the available space in the VCs.

In a preferred non limiting embodiment, every input packet is maintained in its integrity (whole, uncut), by detecting the header part of it, and is entirely assigned to one VC only.

Generally the original input packet sequence must be maintained at the output of the opposite node towards the IP level.

An alternative embodiment is also foreseen in case it is not necessary to respect the original input packet sequence.

A management unit TMN controls the number of connections n, ranging from a minimum of one connection to the maximum available number of connections. This way the minimum granularity is achieved, saving connection capacity as much as possible, and at the same time ensuring that all the incoming packets are arranged into the virtual containers. The smallest scalability is obtained with steps depending on the minimum virtual container size, e.g. VC12 at 2 Mb/s in SDH, to reach a maximum bit rate depending on the maximum transmission capacity, e.g. by multiples of VC4 (144 Mb/s) in SDH.

In a preferred embodiment the TMN unit is a part of a well known Network Management System bidirectionally connected to the interface INT. The skilled in the art is able to adapt an existing TMN system, by using normal and well known software routines, to further comprise suitable functionality to control the interface INT and implement the new described functions.

In the opposite direction from SDH-NE to IP, the interface INT picks up the data packets from the virtual containers of another number of available connections in that direction, n+1VC, . . . , mVC, and organizes them sequentially on the connection from SDH-NE to IP.

Figure 2:
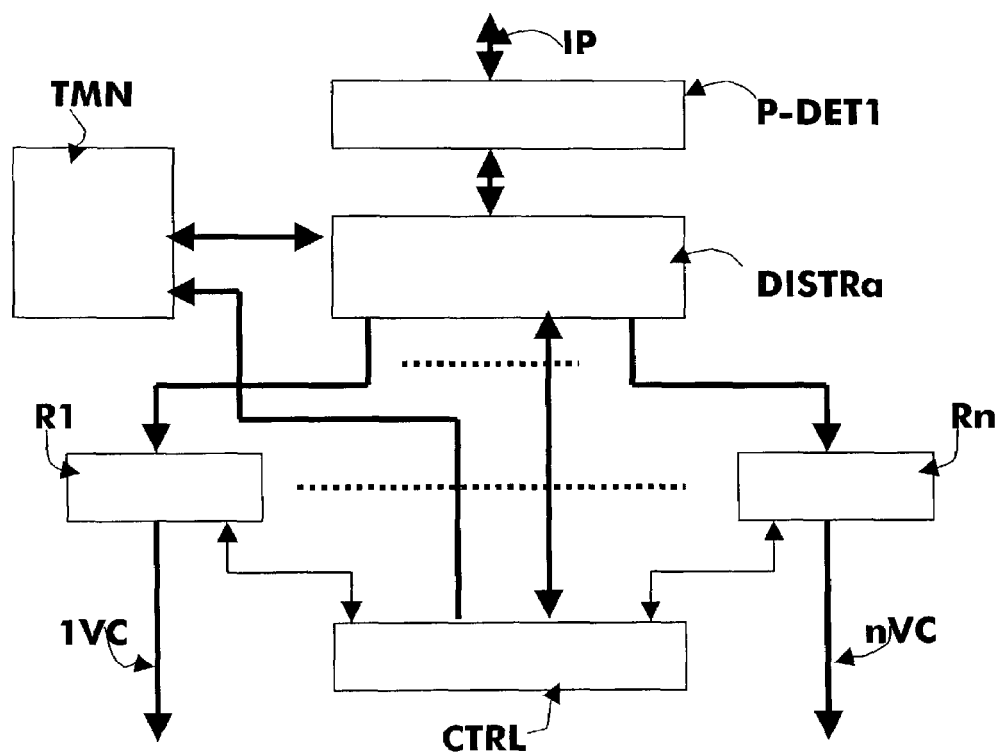
FIGS. 2 and 3 show schematic diagrams of the internal constitution of block INT according to the present invention.

As shown in FIG. 2, the interface INT comprises the following functional blocks for handling the data packets coming from the IP level.

A block P-DET1, having the function of data packet detector, which receives the incoming packets from the IP level, and forwards them sequentially to the block DISTRa. P-DET1 includes register means for buffering the incoming packets and recognizing them, for example by finding the beginning of the header part through the matching of a given bit sequence in the header with a fixed internal one. This way packets having also a variable length can be detected and served.

In a preferred embodiment P-DET1 also includes means for counting the incoming packets and inserting an identifying tag at every packet, so as to recover the original incoming packet sequence at the output of the other link end, if requested. This can be made for example by enlarging the packet size by one byte, carrying the counting, before or after the packet.

In an alternative embodiment the means for counting the incoming packets are not included, when it is not necessary to recover the original incoming packet sequence at the output of the other connection side.

The input data clock of P-DET1 is synchronized to the clock of the IP level, while the output data clock is synchronized to the clock of the SDH level.

A block DISTRa, working as a packet distributor, receives the packets from P-DET1 in sequence and distributes them over a number n of available connections of the SDH level. An incoming packet (possibly with the tag byte) is sent to one of the available registers R1, . . . Rn according to a distribution selection made by DISTRa controlled by the management unit TMN and an internal controller CTRL.

The controller CTRL checks the filling level of the registers R1, . . Rn. The information about the filling level of the registers is also sent to the management unit TMN In one embodiment CTRL gives an indication to DISTRa about which register has more available space to accept the next incoming packet. This embodiment can be used when it is not necessary to maintain the original input packet sequence, or when inserting an identifying tag at every packet. This way the packet sequence in the various registers may be different with respect to the input packet sequence: DISTRa can freely select which register carries the next incoming packet.

In another embodiment CTRL gives an indication to DISTRa when the next incoming packet has to be inserted in the next register, as the given register has no space enough to carry the packet. This way the packets are sequentially written in consecutive registers, and the sequence of input packets can be maintained, at the output of the other link end, by simply ensuring that the registers at the output are read in the same sequence as the input one.

The management unit TMN sets the number n of connections 1VC, nVC, in cooperation with the controller CTRL, depending on the information on the total incoming packet data rate (global average filling level of all the registers) compared with the transport capacity of the virtual containers, the capacity of one virtual container corresponding to the transport capacity of one SDH connection. The number n ranges from one to the maximum number of connections available at the given node.

The registers R1, . . . Rn implement the known mechanism by which the SDH frames are created, keeping into account that here every SDH frame is composed by the only sequence of lowest-order virtual container VC12. The way how the registers R1, . . . Rn work and are made is well known to the skilled in the art.

Figure 3:
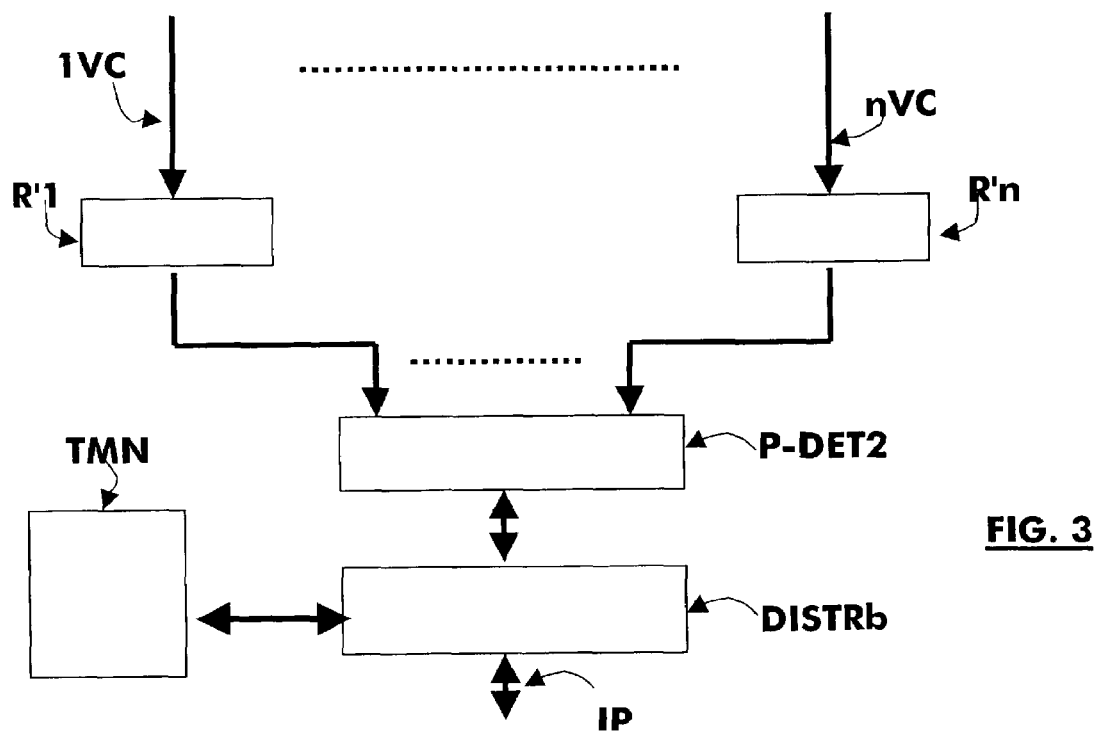

As shown in FIG. 3, the corresponding interface INT at the other end of the link between two nodes comprises the following functional blocks for handling the data packets coming from the SDH level.

A number of registers R'1, . . . R'n, with dual function to that of registers R1, . . . Rn of FIG. 2, for receiving the virtual containers of the relating connections 1VC, . . . nVC, and sending the payload information, corresponding to the sequences of data packets, to a block P-DET2 having the function of data packet detector.

P-DET2 receives the sequences of data packets from the registers R'1, . . . R'n, detects the various packets with a procedure dual to that of P-DET1 and sends the packets to the distributor DISTRb.

The distributor DISTRb arranges the packets sequentially on the connection to the IP level.

When it is not necessary to maintain the original packet input sequence, DISTRb serves them as soon as they come in, without preserving their input order.

If P-DET1 of FIG. 2 inserts the identifying tags, DISTRb includes means for taking the tags out and arranging the packets on the IP connection according to the tag sequence.

If DISTRa of FIG. 2 arranges the sequence of input packets sequentially over consecutive registers, DISTRb includes means for selecting the same sequence of registers to be read, so as to ensure that the original input packet sequence is maintained on the IP connection.

A similar constitution is provided in the two interfaces INT at the two ends of the link between two nodes, for serving the connections in the opposite direction n+1VC, . . . mVC.

The management unit TMN sets the number of connections n+1VC, . . . mVC, and controls the distributor DISTRb so as to set a corresponding number of inputs for the packet sequences received.

The number n of connections in the direction IP-SDH of a link is independent from the number m of connections in the opposite direction SDH-IP.

Further implementation details will not be described, as the man skilled in the art is able to carry out the invention starting from the teaching of the above description.

I claim:

1. A method for connecting an asynchronous packet level and a synchronous hierarchy level between nodes of a telecommunication network, wherein the method comprises:
   receiving incoming packets from the asynchronous packet level;
   arranging the received packets into multiple lower-order virtual containers of the synchronous hierarchy level, the multiple lower-order virtual containers being carried over parallel connections of the telecommunication network;
   handling the incoming packets independently of each other;
   selecting a connection by evaluating an instantaneous filling level of the multiple lower-order virtual containers of all the connections;
   inserting the handled incoming packets in a lower-order virtual container of the selected connection; and
   assigning consecutive packets to different lower-order virtual containers, depending on the available space in the multiple lower-order virtual containers.

2. A method according to claim 1, wherein arranging the received packets into multiple lower-order virtual containers of the synchronous hierarchy level comprises the step of varying and controlling the number of connections as a function of a total incoming packet data rate.

3. A method according to claim 1 further comprising the steps of:
   maintaining the integrity of every input packet by detecting a header part of the input packet; and
   assigning the input packet entirely to one lower-order virtual container only.

4. A method according to claim 1, further comprising the step of associating an identifying tag to each incoming packet in the lower-order virtual containers, so that the original incoming packet sequence in the connection to the asynchronous packet level is recovered.

5. A method according to claim 1, further comprising the step of inserting sequentially the incoming packets in lower-order virtual containers of consecutive connections, said insertion sequence being the same as for rearranging the packets towards the asynchronous packet level, so as to recover the original incoming packet sequence in the connection to the asynchronous packet level.

6. An apparatus for connecting an asynchronous packet level and a synchronous hierarchy level between nodes of a telecommunication network, wherein the apparatus comprises:
   means for receiving incoming packets from the asynchronous packet level;
   means for arranging the received packets into multiple lower-order virtual containers of the synchronous hierarchy level, the multiple lower-order virtual containers being carried over parallel connections of the telecommunication network;
   means for handling the incoming packets independently of each other;
   means for selecting a connection by evaluating an instantaneous filling level of the multiple lower-order virtual containers of all the connections;
   means for inserting the handled incoming packets in a lower-order virtual container of the selected connection; and
   means for assigning consecutive packets to different lower-order virtual containers, depending on the available space in the multiple lower-order virtual containers.

7. An apparatus according to claim 6, further comprising means for dynamically controlling the arrangement of the received packets in the synchronous hierarchy level according to the total incoming packet data rate.

8. An apparatus according to claim 7 further comprising:
   means for receiving and detecting the header part of input packets;
   first means for distributing said input packets to the lower-order virtual containers of the connections;
   means for controlling the instantaneous filling level of said lower-order virtual containers of all the connections, which cooperates with said first means for distributing and said means for receiving so as to:
   entirely assigning a packet to one lower-order virtual container only;
   distributing consecutive packets to the lower-order virtual containers according to said instantaneous filling level and to the available space in said lower-order virtual containers of all the connections; and
   second means for distributing the packets, coming from the connections of the synchronous hierarchy level, sequentially on the connection to the asynchronous packet level.

9. An apparatus according to claim 8, wherein
   said means for receiving and detecting the header part of the input packets add an identifying tag to each incoming packet;
   said second means for distributing the packets take said identifying tag out, and arrange the packets on the connection to the asynchronous packet level according to the value of said identifying tag, so as to recover the original incoming packet sequence.

10. An apparatus according to claim 8, wherein
    said first means for distributing said input packets to the lower-order virtual containers insert the packets sequentially in lower-order virtual containers of consecutive connections; and
    said second means for distributing the packets, rearrange the packets on the connection to the asynchronous packet level with the same sequence of distribution to the lower-order virtual containers of said first means for distributing, so as to recover the original incoming packet sequence in the connection to the asynchronous packet level.

11. The method according to claim 1, wherein the multiple lower-order virtual containers are concatenated.

* * * * *